United States Patent [19]

Rigney

[11] 4,005,899
[45] Feb. 1, 1977

[54] AUTOMOBILE ANTI-GLARE SHIELD

[76] Inventor: John T. Rigney, 6548 Parkdale Plaza, Martinez, Calif. 94553

[22] Filed: July 28, 1975

[21] Appl. No.: 599,515

[52] U.S. Cl. .......................... 296/97 E; 296/97 G
[51] Int. Cl.² .......................................... B60J 3/00
[58] Field of Search ............ 296/97 R, 97 A, 97 E, 296/97 G; 160/135, 351; 350/276 R

[56] References Cited

UNITED STATES PATENTS

| | | | |
|---|---|---|---|
| 2,305,677 | 12/1942 | Cotton | 296/97 E |
| 2,596,836 | 5/1962 | Bruhl | 296/97 E |
| 2,938,248 | 5/1960 | Hadary | 160/351 |
| 3,003,812 | 10/1961 | Haugland | 296/97 E |
| 3,371,955 | 3/1968 | Herrington | 296/97 G |
| 3,677,322 | 7/1972 | Brorson | 160/135 |

FOREIGN PATENTS OR APPLICATIONS 1,915,554 10/1970 Germany ........................ 296/976

Primary Examiner—Philip Goodman
Assistant Examiner—John A. Carroll
Attorney, Agent, or Firm—Townsend and Townsend

[57] ABSTRACT

An anti-glare shield for use on automobile dashboards to prevent light reflected by portions of the automobile from reaching the driver. The glare shield has a plurality of opaque, serially arranged shield sections the vertical edges of which are hingedly interconnected so that the shield can be placed on the dashboard in a zig-zag, self-supporting fashion.

11 Claims, 4 Drawing Figures

U.S. Patent     Feb. 1, 1977     4,005,899
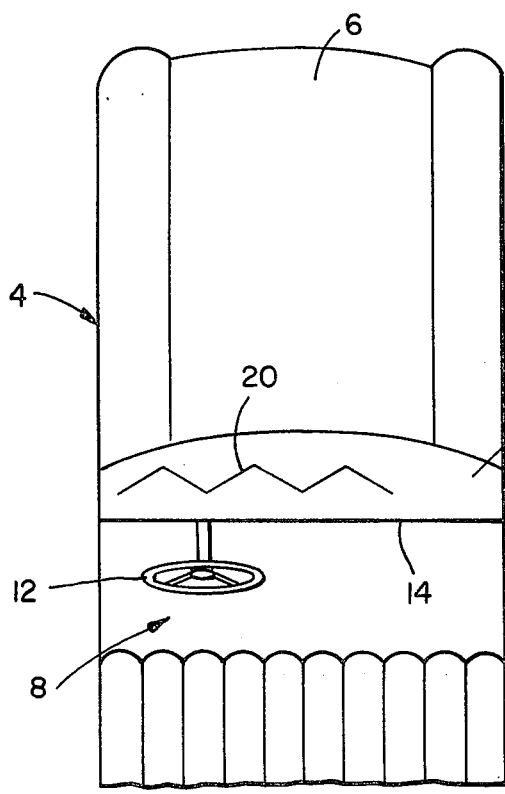
FIG _ 1
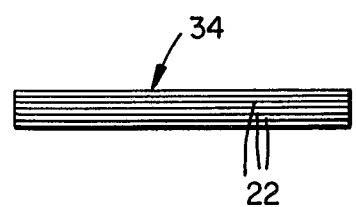
FIG _ 3
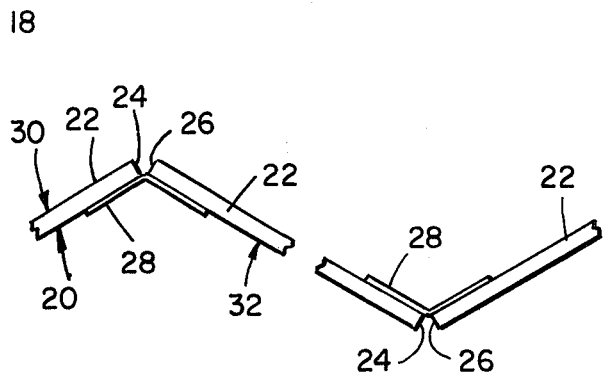
FIG _ 4
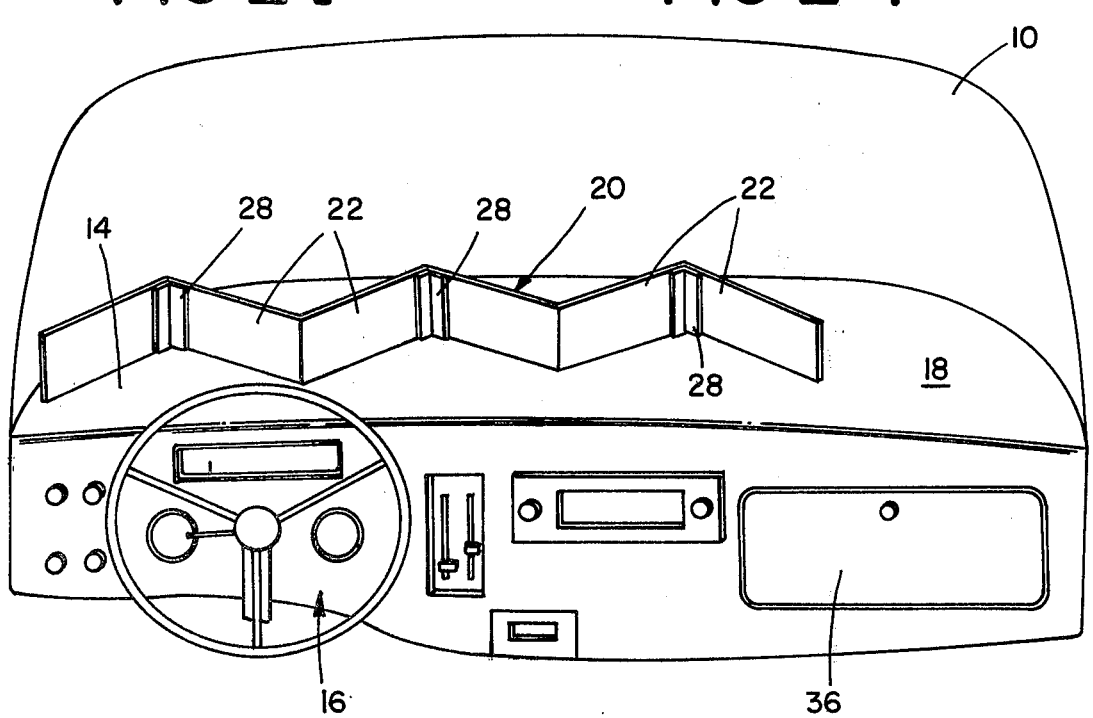
FIG _ 2

AUTOMOBILE ANTI-GLARE SHIELD

BACKGROUND OF THE INVENTION

Automobile drivers frequently experience glare from direct sunlight entering through the windshield as well as from light reflected by portions of the automobile, particularly the automobile hood, and reflecting ornaments on the hood or mounted to the front portion of the automobile and visible through the windshield. Virtually all automobiles have provisions to limit or prevent glare from direct sunlight by retractably mounting sunvisors above the windshield. Normally, however, no means is provided for shielding the driver from light reflected by the front portion of the automobile (hereinafter "hood"). Nevertheless, such reflection can be as annoying and potentially hazardous as glare from direct sunlight.

In the past, attempts have been made to shield the driver from light reflected by the hood by mounting to a portion of the interior of the automobile a vertically extensible, sectional shield. Such shields are to be mounted to what is commonly referred to as the automobile dashboard. U.S. Pat. Nos. 2,305,677 and 3,003,812 are exemplary of such anti-glare shields. In general terms the anti-glare shields disclosed in these patents are permanently mounted, e.g. bolted to a portion of the dashboard and they comprise a plurality of horizontally elongated shield sections. Adjacent, horizontal edges of the sections are hingedly interconnected so that the whole shield can be raised into its anti-glare position or retracted when not needed.

The glare shields disclosed in the referenced patents are add-on features and since the dashboards have no convenient provisions for mounting them thereon they are generally unattractive and may interfere with the driver's view of the instrument panel or with the accessibility and usefulness of the horizontal dashboard portion. Even though the shield is typically used infrequently, that is, only at such times as the relative position of the sun causes reflection from the hood to strike the driver, it interferes with the proper use of the dashboard and the instrument panel at all times. In other words, such shields are mostly a nuisance.

More seriously, when the shield is in its extended position, all shield sections are generally unsupported. An inherent stiffness in the connecting hinges or secondary frictional support mechanisms (such as shown in U.S. Pat. No. 3,003,812) keep the shield in its extended position. The constant shock and vibration to which the connections are subjected during normal driving conditions, however, have a tendency to cause the shield to retract unless the connections are exceedingly rigid and, therefore, hard to operate. In either event the shield is difficult to use and, due to the many component parts, assembly requirements, etc. relatively expensive. As a consequence, such anti-glare shields have never come into any widespread use and drivers continue to be annoyed and exposed to potential hazard from light reflected by the hood.

SUMMARY OF THE INVENTION

The present invention provides a simple, low cost and conveniently used anti-glare shield to prevent light reflected by the hood of an automobile from reaching the driver. Generally, speaking the anti-glare shield of the invention is placed on a horizontal surface of an automobile dashboard and comprises a plurality of shield sections constructed of an opaque and relatively rigid material. Each section has a height substantially less than the height of the windshield of the automobile and a length which is greater than the length of the section. The glare shield has an overall length many times greater than its height and it further includes hinge means aligning and hingedly interconnecting the sections for relative pivotal movement of the sections about horizontal axes. In use the sections are arranged in a zig-zag fashion on the horizontal dashboard surface to thereby render the glare shield self-supporting without requiring it to be permanently secured to any portion of the automobile.

The anti-glare shield of the invention preferably has more than three serially arranged shield sections and the hinge means comprises a flexible web material, such as a strip of adhesive tape, relatively thin, flexible plastic, or the like which is secured, e.g., bonded to portions of the shield sections adjacent proximate common hinge axes.

When the anti-glare shield of the invention is not in use it can be folded into a thin, compact stack of shield sections that is readily stored in the glove compartment of the automobile, under the driver's seat, in a side pocket, or the like. Thus, the shield is neither aesthetically disturbing during all but the few times when it is in actual use, nor does it interfere with the view of the automobile instrument panel or the usefulness of the horizontal dashboard surface as a convenient storage place for objects used during driving. Yet, when the need for the anti-glare shield arises it is quickly erected by simply laying it out on the horizontal dashboard surface. It will remain in that position and it will not collapse under normal driving shocks and vibrations as can be the case with prior art anti-glare shields.

Moreover, the anti-glare shield of the invention is simple, it comprises no more than a plurality of low cost, flat section panels and interconnecting adhesive tape or the like. Complicated high friction hinge connections, support structures and the like as found or prior art devices are eliminated. Consequently, the anti-glare shield of the invention is substantially less expensive to make than prior art shields.

Additionally, the shield of the present invention can be constructed of "readily cut materials", such as, cardboard, opaque, semi-transparent plastic sheet and the like which can be trimmed to the desired length and height with available household tools, such as scissors, to suit particular automobiles and/or drivers. Thus, a single shield device can be manufactured and stocked as contrasted with the need for manufacturing and storing multiple shield sizes and connector constructions as was necessary in the prior art. This yields further cost savings or both the manufacturer and the end user while it permits the shield to be cut to the most convenient size. Lastly, since the shield is an add-on device for the automobile the elimination of all installation, the drilling of holes, the use of clamps or adhesives and the like is eliminated. The prospective user simply purchases the shield and it is ready for instantaneous use without further installation costs.

Consequently, the anti-glare shield of the present invention is a substantial improvement over the prior art in that it both enhances the usefulness of such shields while it greatly reduces their cost.

BRIEF DESCRIPTION OF THE DRAWINGS

FIG. 1 is a fragmentary plan view of an automobile (with the roof removed to view the interior thereof) illustrating an anti-glare shield constructed and mounted in accordance with the present invention;

FIG. 2 is an enlarged fragmentary perspective elevational view of an automobile dashboard instrument panel showing the anti-glare shield mounted thereon;

FIG. 3 is a side elevational view of the anti-glare shield of the invention in its collapsed state; and FIG. 4 is an enlarged, fragmentary plan view showing the hinged connection of adjacent anti-glare shield sections.

DESCRIPTION OF THE PREFERRED EMBODIMENTS

Referring to the drawings, an automobile 2 generally comprises a front portion 4 including a hood 6, a passenger compartment 8, and a windshield 10 separating the passenger compartment from the exterior. The customary steering wheel 12 protrudes rearwardly from a dashboard 14 having an instrument panel 16 and a horizontal dashboard surface 18.

An anti-glare shield 20 constructed in accordance with the present invention is shown positioned on horizontal dashboard surface 18. The shield is constructed of a plurality of at least two and preferably of three or more shield sections 22 which are serially arranged and hingedly interconnected so that they can be pivoted relative to each other about vertical axes. Each section is constructed of an opaque material, such as, cardboard, a relatively stiff plastic panel and the like. For the purposes of this invention the term "opaque" is intended to include and includes materials which may permit some light to pass therethrough as long as the material reduces the light intensity sufficiently so that reflected sunlight does not cause distractive glare in the driver's eyes.

Each section has a preferably rectangular shape, a height which is substantially less than the height of the windshield to afford the driver a view of the road ahead and a length which is greater than the height of the section. Consequently, the fully assembled, multi-sectional shield has a length which is many times greater than its height.

Proximate edges 24, 26 of adjacent sections are interconnected by a suitable hinge connector, preferably a strip 28 of a flexible material such as webbing, plastic, adhesive tape and the like. Each half of the strip is secured, e.g., bonded to portions of the adjacent shield sections which adjoin edges 24 and 26. It will be observed that the hinge strips 28 are applied to alternate sides 30, 32 of the shield as is best shown in FIG. 4 so that the shield can be collapsed into a compact stack of face-to-face shield sections as illustrated in FIG. 3.

The use of anti-glare shield 20 should now be apparent. To summarize it, when sunlight (or other light) is reflected from hood 6 and causes glare in the driver's eyes, shield 20 is opened by hinging shield sections 22 relative to each other until the shield has a zig-zag configuration as is shown in FIG. 2. In this configuration the shield is self-supporting and can be placed on the dashboard. The shield can be adjusted by sliding it over the horizontal dashboard surface 18 until it is in the most effective, glare-shielding position. Moreover, its overall length can be increased or decreased to suit the driver's needs as well as to adjust the shield to the physical dimensions of the particular dashboard on which it is placed. It should be noted that from a practical point of view, this self-supporting positioning of the anti-glare shield is only possible by orienting the hinge axes between the shield sections vertically, and by constructing the shield so that its dimension perpendicular to the hinge axes, i.e., its length, is many times greater than its dimension parallel to the hinge axes, i.e., its height and by constructing the shield so that a sufficient number of longitudinal undulations can be generated to form a sturdy base. As above mentioned, for this reason, it is preferred to provide the shield with at least three sections so that the shield can be formed into an effective zig-zag shape.

When the need for the anti-glare shield of the present invention ceases it can be quickly guarded by collapsing the sections into a stack 34 and storing the stack in glove compartment 36 or in any other convenient storage place in the passenger compartment 8.

I claim:

1. In an automobile having a passenger compartment, a windshield separating the compartment from an exterior of the automobile, a dashboard disposed on the compartment beneath the windshield and including a generally horizontal surface contiguous with the windshield, and an anti-glare shield to shield the driver of the vehicle from light reflected by a front portion of the vehicle, the improvement to the anti-glare shield comprising a plurality of opaque, serially arranged shield sections loosely supported by and resting on the dashboard; hinge means for hingedly interconnecting the sections for pivotal movements of the sections about vertical hinge axes; the shield sections having a width parallel to hinge axes and a length perpendicular thereto, the length of the sections being greater than their widths so that the shield is self-supporting when loosely positioned zig-zag fashion on an automobile dashboard.

2. An anti-glare shield according to claim 1 wherein the sections comprise flat sections.

3. An anti-glare shield according to claim 1 wherein the hinge means comprises a flexible web material and means connecting the web to portions of adjacent shield sections proximate a common hinge axis.

4. An anti-shield according to claim 1 comprising at least three serially arranged, pivotally interconnected shield sections.

5. An anti-glare shield according to claim 1 wherein the total length of the shield parallel to the section length is many times greater than the width of the shield parallel to the section width.

6. In combination, an automobile having a passenger compartment; a windshield separating the compartment from an exterior of the automobile; a dashboard disposed in the compartment beneath the windshield and including a generally horizontal surface extending over a major portion of the length of the windshield; and an anti-glare shield loosely positioned on the horizontal dashboard surface, the glare shield having a plurality of shield sections constructed of an opaque, readily cut material, the sections having a height substantially less than a height of the windshield, the anti glare shield having an overall length many times greater than its height, means aligning and hingedly interconnecting the section for relative pivotal movement of the sections about vertical axes, the sections being arranged in a zig-zag fashion on the horizontal surface so that the glare shield is self supporting thereon.

7. The combination of claim 6 and further including at least three serially arranged shield sections.

8. The combination of claim 7 wherein the shield sections have a length which is greater than their height.

9. The combination of claim 7 wherein the hinge means comprises a strip of a flexible material and means securing the strip to proximate edge portions of adjacent shield sections.

10. The combination of claim 9 wherein the anti-glare shield comprises at least three hingedly interconnected sections, and wherein the strips forming consecutive hinge connections are alternately secured to one and the other side of the shield to enable the collapse of the shield into a compact stack of shield sections.

11. In combination, an automobile having a passenger compartment; a windshield separating the compartment from an exterior of the automobile; and dashboard disposed in the compartment beneath the windshield and including a generally horizontal surface extending over a major portion of the length of the windshield; and an anit-glare shield carried by and loosely positioned on the horizontal dashboard surface, the anti-glare shield having a height substantially less than a height of the windshield, an overall length many times greater than its height, and a longitudinally undulating configuration so that the glare shield is self-supporting on and freely removable from the horizontal dashboard surface.

* * * * *